US009505591B2

(12) United States Patent
Morath et al.

(10) Patent No.: US 9,505,591 B2
(45) Date of Patent: Nov. 29, 2016

(54) CRANE, IN PARTICULAR CRAWLER CRANE OR MOBILE CRANE

(75) Inventors: Erwin Morath, Ehingen-Lauterach (DE); Edwin Cettinich, Schelklingen-Justingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 600 days.

(21) Appl. No.: 13/272,817

(22) Filed: Oct. 13, 2011

(65) Prior Publication Data

US 2012/0095653 A1 Apr. 19, 2012

(30) Foreign Application Priority Data

Oct. 14, 2010 (DE) .................... 20 2010 014 310 U

(51) Int. Cl.
*G06F 7/00* (2006.01)
*B66C 23/90* (2006.01)

(52) U.S. Cl.
CPC .................................. *B66C 23/905* (2013.01)

(58) Field of Classification Search
CPC ..... B66C 23/905; B66C 13/44; B66C 13/46; B66C 15/04; B66C 15/06
See application file for complete search history.

(56) References Cited

U.S. PATENT DOCUMENTS

| | | | | |
|---|---|---|---|---|
| 5,217,126 | A * | 6/1993 | Hayashi et al. | 212/277 |
| 5,730,305 | A * | 3/1998 | Ichiba et al. | 212/276 |
| 5,823,370 | A | 10/1998 | Ueda | |
| 2005/0098520 | A1* | 5/2005 | Frankenberger et al. | 212/276 |
| 2007/0156280 | A1* | 7/2007 | Morath | 700/213 |
| 2008/0053945 | A1* | 3/2008 | Schneider et al. | 212/276 |
| 2009/0182537 | A1* | 7/2009 | Kang et al. | 703/2 |
| 2011/0106446 | A1* | 5/2011 | Waeller | B60K 35/00 701/533 |
| 2012/0101694 | A1* | 4/2012 | Morath et al. | 701/50 |

* cited by examiner

*Primary Examiner* — Rami Khatib
*Assistant Examiner* — Nicholas K Wiltey
(74) *Attorney, Agent, or Firm* — Dilworth & Barrese, LLP.

(57) ABSTRACT

The present invention relates to a crane, in particular to a crawler crane or mobile crane having at least one monitoring and simulation means by means of which a state of the crane can be monitored and/or simulated, wherein the monitoring and simulation means has at least one input means and at least one output means and wherein the actual state and/or state development of the crane and/or of the boom of the crane can be displayed by means of the monitoring and simulation means and/or a possible state and/or possible state development of the crane can be simulated and/or displayed.

24 Claims, 14 Drawing Sheets

14

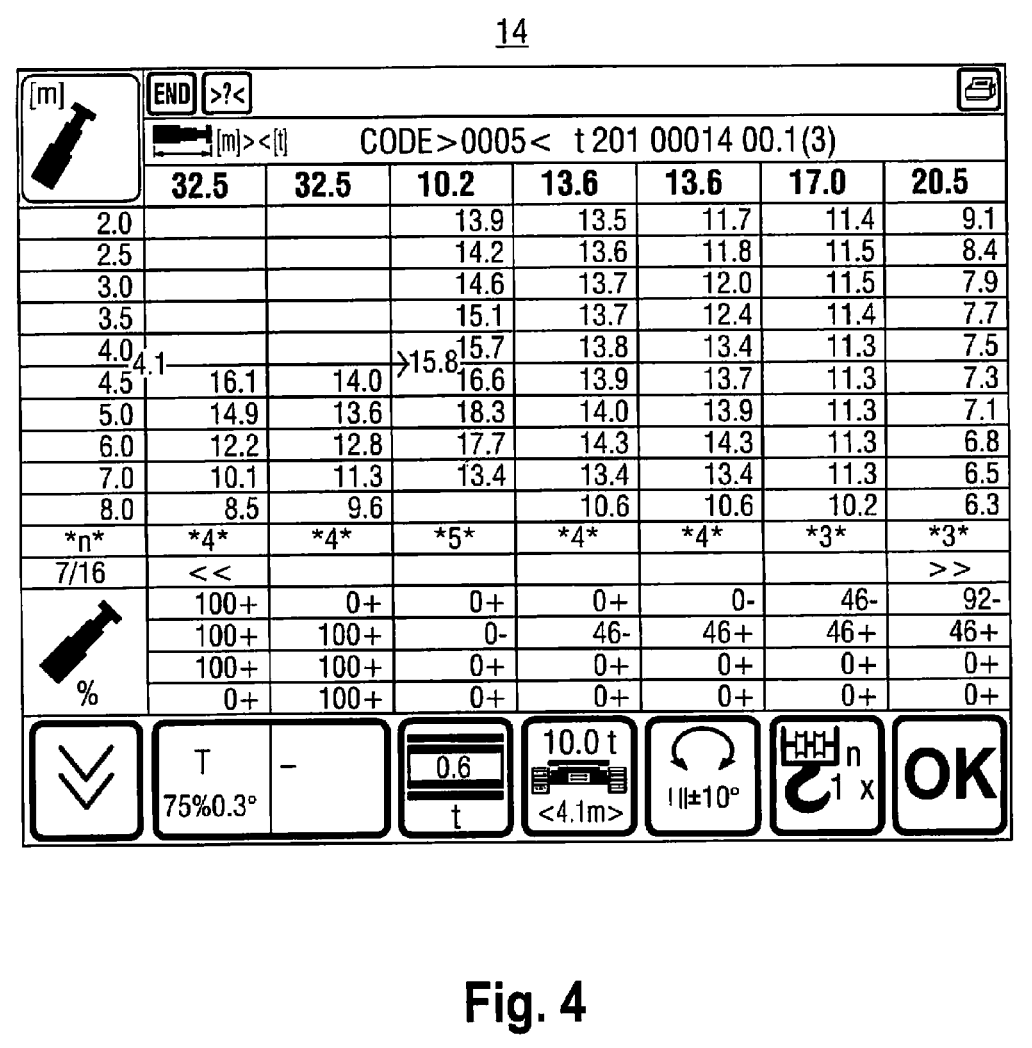

14

[m] END >?<

[m]><[t] CODE>0005< t 201 00014 00.1(3)

| | 32.5 | 32.5 | 10.2 | 13.6 | 13.6 | 17.0 | 20.5 |
|---|---|---|---|---|---|---|---|
| 2.0 | | | 13.9 | 13.5 | 11.7 | 11.4 | 9.1 |
| 2.5 | | | 14.2 | 13.6 | 11.8 | 11.5 | 8.4 |
| 3.0 | | | 14.6 | 13.7 | 12.0 | 11.5 | 7.9 |
| 3.5 | | | 15.1 | 13.7 | 12.4 | 11.4 | 7.7 |
| 4.0 | 4.1 | ─ | >15.8 15.7 | 13.8 | 13.4 | 11.3 | 7.5 |
| 4.5 | 16.1 | 14.0 | 16.6 | 13.9 | 13.7 | 11.3 | 7.3 |
| 5.0 | 14.9 | 13.6 | 18.3 | 14.0 | 13.9 | 11.3 | 7.1 |
| 6.0 | 12.2 | 12.8 | 17.7 | 14.3 | 14.3 | 11.3 | 6.8 |
| 7.0 | 10.1 | 11.3 | 13.4 | 13.4 | 13.4 | 11.3 | 6.5 |
| 8.0 | 8.5 | 9.6 | | 10.6 | 10.6 | 10.2 | 6.3 |
| *n* | *4* | *4* | *5* | *4* | *4* | *3* | *3* |
| 7/16 | << | | | | | | >> |
| % | 100+ | 0+ | 0+ | 0+ | 0- | 46- | 92- |
| | 100+ | 100+ | 0- | 46- | 46+ | 46+ | 46+ |
| | 100+ | 100+ | 0+ | 0+ | 0+ | 0+ | 0+ |
| | 0+ | 100+ | 0+ | 0+ | 0+ | 0+ | 0+ |

T 75%0.3° | – | 0.6 t | 10.0 t <4.1m> | ±10° | n 1 x | OK

Fig. 4

| | 17.0 | 17.0 | 20.5 | 23.9 | 10.2 | 13.6 | 13.6 |
|---|---|---|---|---|---|---|---|
| 2.0 | 10.3 | 11.5 | 11.3 | | 14.7 | 14.2 | 13.5 |
| 2.5 | 10.0 | 11.5 | 11.3 | 7.9 | 15.0 | 14.4 | 13.7 |
| 3.0 | 9.8 | 11.6 | 11.1 | 7.6 | 15.4 | 14.5 | 13.8 |
| 3.5 | 9.6 | 11.8 | 11.0 | 7.4 | 15.9 | 14.6 | 14.1 |
| 4.0 | 9.4 | 11.9 | 10.9 | 7.2 | 16.8 | 14.6 | 14.3 |
| 4.5 | 9.3 | 12.1 | 10.8 | 6.9 | 18.2 | 14.7 | 14.6 |
| 5.0 | 9.1 | 12.1 | 10.7 | 6.7 | 19.1 | 14.8 | 14.8 |
| 6.0 | 8.2 | 12.2 | 10.6 | 6.4 | 17.7 | 15.1 | 15.3 |
| 7.0 | 8.0 | 12.1 | 10.5 | 6.1 | 13.4 | 13.8 | 13.8 |
| 8.0 | ~~7.8~~ → | 10.4 | 9.8 | 5.8 | | 11.0 | 11.0 |
| *n* | *3* | *3* | *3* | *2* | *5* | *4* | *4* |
| 8/16 | << | | | | | | >> |
| | 0+ | 0- | 46- | 92- | 0+ | 0+ | 0+ |
| | 92- | 92+ | 92+ | 92+ | 0+ | 0+ | 0- |
| | 0+ | 0+ | 0+ | 0+ | 0- | 46- | 46+ |
| % | 0+ | 0+ | 0+ | 0+ | 0+ | 0+ | 0+ |

14

CRANE, IN PARTICULAR CRAWLER CRANE OR MOBILE CRANE

BACKGROUND OF THE INVENTION

The present invention relates to a crane, in particular a crawler crane or a mobile crane, and to a monitoring and simulation means for a crane.

In known cranes such as crawler cranes or mobile cranes in general, provision can be made to equip these cranes with an operations planner.

A crane is thus known from DE 10 2005 059 768 A1, for example, which is provided with a crane monitoring device for monitoring the operating status of the crane comprising a calculation unit and an operating and display unit. An operations planner substantially comprising a further calculation unit and having a separate monitor output is furthermore provided which works, on the one hand, as an apparatus for planning the crane operation and, on the other hand, as a redundant crane monitoring unit in addition to the crane monitoring unit.

The operations planning possible using such an operations planner allows the generation and display of payload tables in which degrees of freedom possible for the respective configuration of the crane are taken into consideration. In this respect, there is always a main luffing movement which can be configured differently depending on the operating mode. In main boom operation and in operating modes using cylinder-adjustable or fixed accessories, the main luffing movement is the boom luffing, whereas in operation with a movable accessory boom, for instance an accessory boom movable via ropes, the main luffing movement is the luffing of the accessory boom. The main luffing movement is shown inside columns in the tabular payload representation. Further operating movements which are taken into account in the tabular payload representation are shown with the aid of other columns in the tabular payload representation.

These tables have proven themselves in practice; however, it would be desirable to find stored payload values not only for exactly defined states at discrete radius steps. Currently, the currently maximum permitted payload is always calculated and displayed by the crane control in the intermediate states. However, the crane operator does not receive any information on the maximum permitted payload for other positions differing from the current position of the crane.

A crane is furthermore known from EP 1 444 162 B1 having an operations planner which has a graphical display, wherein the sphere of action of the crane can be displayed between a solid line and a dashed line under the given parameter settings in a work mode and in a planning mode in a diagram having a counterweight radius as the x axis and a load radius as the y axis.

SUMMARY OF THE INVENTION

It is therefore the object of the present invention to further develop a crane of the initially named kind in an advantageous manner, in particular such that said crane can display the current payload and/or possible payloads, in particular maximum possible payloads or crane movements, in a simple and understandable manner.

This object is achieved in accordance with the invention by a crane having the features herein. Provision is accordingly made that a crane is provided with at least one monitoring and simulation means by means of which a state of the crane can be monitored and/or simulated, wherein the monitoring and simulation means has at least one input means and at least one output means and wherein the actual state and/or state development of the crane and/or of the boom of the crane can be displayed by means of the monitoring and simulation means and/or a possible state and/or possible state development of the crane can be simulated and/or displayed.

The crane can in particular be a crawler crane or a mobile crane. It is advantageously possible to be able to display current and/or possible payloads, in particular maximum possible payloads or crane movements in a simple and understandable manner. The display is preferably a graphical display which can be understood simply and intuitively. The comparatively time-consuming evaluation of the payload tables can be omitted, instead the crane driver or crane operator can recognize the current state or a possible state of the crane at a glance and can thus estimate the current state e.g. with respect to the payload and/or can plan further crane movements.

Provision can furthermore be made that the monitoring and simulation means has at least one calculation unit and/or is connectable or connected to at least one calculation unit, wherein the parameters describing the current state of the crane can be evaluated by means of the calculation unit and/or wherein a possible state and/or a possible state development of the crane can be simulated and/or calculated by means of the calculation unit.

It is furthermore conceivable that the monitoring and simulation means has at least one model generating means, wherein the state development and/or the possible state development can be calculated by cooperation of the calculation unit and the model generating means. The state development, with this being able to be the current and/or a possible state development, can be calculated approximately, for example. It is a model of the state development in the widest sense. The state development and/or the possible state development can accordingly in particular be modeled by cooperation of the calculation unit and the model generating means and can preferably be modeled as a model in the form of at least one mathematical function.

Provision can furthermore be made that the state development and/or the possible state development can be displayed as a graph or curve, in particular as a functional curve of the generated model, wherein the actual state of the crane and/or the possible actual state of the crane can be displaced on the graph or on the curve and can in particular be displayed highlighted with respect to the environment. The display as a graph or as a curve allows a simple and intuitive understanding at a glance, wherein advantageously not only the current state, but rather also states in the environment of the actual state can be understood simply and intuitively at a glance by the operator. A simple and fast orientation of the operator is made possible by the highlighting of the actual state on the graph or on the curve.

It is furthermore conceivable that the state development is a payload curve of the crane, is in particular a curve of the payload of the crane, wherein the payload curve can preferably be displayed graphically as a curve by means of the output means.

The actual state of the crane can be displayable as a bold dot or cross on the displayed payload curve.

It is furthermore possible that the state development is a state development in dependence on the luffing movement and/or on the telescopic movement of the crane.

Provision can be made that a plurality of curves can be calculated and/or displayed in a plane and/or perspectively for different movements by means of the monitoring and simulation means.

It is moreover conceivable that the payload curve is displayable in dependence on the radius of the crane, wherein the radius is entered on the x axis and the payload is entered on the y axis. A standardized display advantageously allows a handling of the system which is simplified overall so that in particular the handling can also be learned easily.

It is furthermore possible that the monitoring and simulation means can be connected to at least one master switch of the crane, wherein the master switch is operable in at least one first mode and in at least one second mode, wherein at least one crane element can be controlled in the first mode and wherein inputs can be carried out at the monitoring and simulation means by means of the master switch in the second mode, in particular in the manner of a TrackPoint and/or of a PC mouse.

Provision can furthermore be made that the monitoring and simulation means includes at least one monitor having at least one keypad as an input means and having at least one display as an output means or that the monitoring and simulation means is designed as a monitor having at least one keypad as an input means and having at least one display as an output means.

It is moreover possible that at least one pattern relating to movements of the crane can be read out and/or played back virtually from a storage means by means of the monitoring and simulation means, wherein preferably one or more patterns can be generated by means of the monitoring and simulation means, of a directly recorded crane movement, of a crane movement read out of the storage means, in particular of a data logger, and/or of a movement simulated in an operations planner. This pattern can then be used in the crane simulator, for a crane movement, in the test station or in the operations planner. This pattern can furthermore be filled from virtual movements of crane movements directly recorded in the crane simulator and actually traveled or also from the data logger already present on the crane, that is from a processor-controlled storage unit of the crane. In the end, a very good model of the crane movement, at least a model having sufficient accuracy, can be generated.

Provision can furthermore be made that an operations planner substantially comprising at least one further calculation unit is additionally provided which works or can be used, on the one hand, as an apparatus for planning the crane operation and, on the other hand, as a redundant crane monitoring unit in addition to the at least one monitoring and simulation means and/or at least one further present crane monitoring device for monitoring the operating state of the crane. The advantage results from this that a further diverse crane monitoring is additionally made possible. Since the monitoring and simulation means and the operations planner, which can be used both as an apparatus for planning the crane operation and, on the other hand, as a redundant crane monitoring unit, carry out their calculations with the same measured values or sensor values, but by means of different calculation methods, an error can be recognized very fast and corresponding signals such as warnings can be output or an intervention in the control of the crane can be made. It therefore proves to be particularly advantageous that the crane simulation, crane monitoring and operations planner can access identical crane data and crane software. The crane simulation, crane monitoring and operations planner therefore deliver identical results in the normal case so that an error can be detected immediately in the event of deviations. The payload table representation advantageously takes place graphically and not only via discrete sampling points, but rather continuously and over all degrees of freedom which can be traveled during normal operation. A recording and playback of crane movement sequences can take place over crane simulation, crane monitoring and operations planner. The operations planner is preferably provided with a separate monitor output or display means output.

The present invention furthermore relates to a monitoring and simulation means for a crane having the features herein. Provision is accordingly made that a monitoring and simulation means for a crane, in particular for a crawler crane or mobile crane, is designed with the monitoring and simulation means features in accordance with the description herein.

BRIEF DESCRIPTION OF THE DRAWINGS

Further details and advantages of the present invention will now be explained in more detail with reference to an embodiment shown in the drawing.

There are shown:

FIG. 4: a further view of the display of the monitor;

DESCRIPTION OF THE PREFERRED EMBODIMENTS

Figure 1:
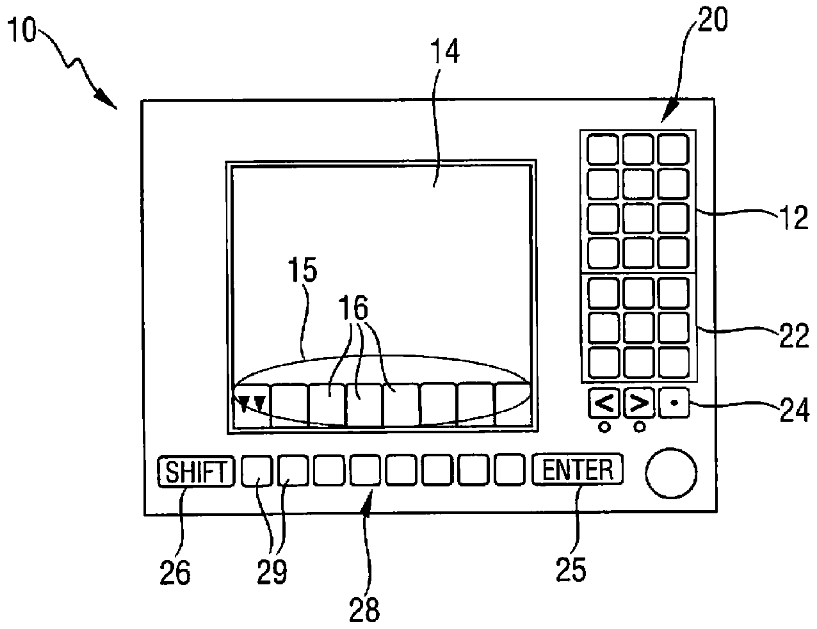
FIG. 1: a frontal view of the monitoring and simulation means.

FIG. 1 shows the monitoring and simulation means 10 for a crane, not shown in any more detail, wherein the monitoring and simulation means 10 is designed as a monitoring and simulation monitor 10 or as a monitoring and simulation unit 10. In this respect, the monitor 10 has an input unit 12 and a display unit 14.

The calculation unit by means of which the current state of the crane, in particular the current parameters which for example relate to the maximum payload of the crane, can be evaluated is likewise also received in the monitor 10. Furthermore, a calculation model by means of which e.g. a possible payload development or movement routine of the crane can be visualized and simulated can be prepared by means of the calculation unit not shown in any more detail and by means of the model generation means stored thereon. The monitor is therefore designed as an all-in one calculator as it were.

The input unit 12 has a plurality of regions, wherein a first region is arranged in the top right part of the monitor 10 and includes a numerical input block 20. A program key block 22 is provided below the numerical block 20, with subprograms being able to be accessed by means of the individual program keys. Special keys 24 are provided below the program key block 22, with further special keys 24, namely an additional enter key 25 and an additional shift key 26 being arranged next to the function key row 28 located below the display 14. In this respect, the enter key 25 is arranged at the right next to the function key row 28 and the shift key 26 is arranged at the left next to the function key row 28 with function keys 29.

The displays shown in the FIGS. 3 to 15 can be shown by means of the display unit 14, as will be described in detail in the following. A display bar 15 or display row 15 comprising a plurality of fields 16 in which the respective assignment and activation of the function keys 29 can be displayed in dependence on the selected program is provided in the lower part of the display unit 14, which can, for example, be a display 14 or, in an advantageous embodiment, a touch screen 14.

At least one program which can include or is in communication with the model generation means is provided on the monitor 10 for operating the crane. The program in this respect has at least two major program parts or operating modes in which it can be operated. On the one hand, for instance, a crane monitoring having a display of the real movements of the crane is provided as a first operating mode and, on the other hand, a crane simulation is provided as a second operating mode having virtual movements of the crane and their display and identical input units.

The crane driver or crane operator can choose freely between these two operating modes. In the "crane monitoring" mode, the crane is traveled with its movable crane elements as known using the input units. The input units, e.g. the master switch or switches or the keys of the input unit 12 on the monitor 10, select the respective associated actuators. The graphical payload display described in the following can take place on the two display regions, in particular "crane monitoring" and "crane simulation".

In the "crane simulation mode", the display on the display region 14 takes place very close to the display in the mode "crane monitoring" known to the crane driver or crane operator. The positions at which the information contents are displayed are, just like the symbols used, intuitively familiar to the crane driver from the "crane monitoring" mode. He can thus immediately operate the "crane simulation" mode and easily receive the relevant information. It is in particular no longer necessary to locate the required value in a laborious manner from a plurality of table values. In both operating modes, the same information is always present so that both program parts immediately use the display corresponding to reality after the switching over.

Provision can, for example, be made that the crane driver or crane operator switches over from the "crane monitoring" into the "crane simulation". The "crane simulation" immediately shows the current state "$Z_{actual}$". In a next step, the further steps can be planned and the crane can simultaneously be traveled into new positions in the "crane simulation" mode. It is then possible to switch back into the "crane monitoring". The display 14 in the "crane monitoring" mode immediately again displays the actually present state "$Z_{actual}$".

The operation of both parts of the program, namely "crane monitoring" and "crane simulation" takes place via the same input units 20, 22, 24, 25, 26, 28, 29 of the input unit 12 The inputs from the input unit 12 in this respect likewise have substantially the same effects on the display area 14 of the monitor 10. In the "crane monitoring" mode, the corresponding actuator of the crane element to be moved is controlled first. This is, however, naturally not the case in the "crane simulation" mode.

Provision can furthermore be made that the actual crane movements are controlled in accordance with a pattern from existing records.

For reasons of safety, the movement is naturally not carried out fully automatically, but rather only as long and as fast as the master switch is deflected. If the master switch is again actuated in the provided manner after the stop, the planned movement is continued.

Naturally, the real movements are also still monitored by the crane control with its load-torque limitation, and indeed independently, and thus redundantly, of the monitor 10 which likewise serves as a monitoring means in addition to its function as a simulation means.

Figure 2:
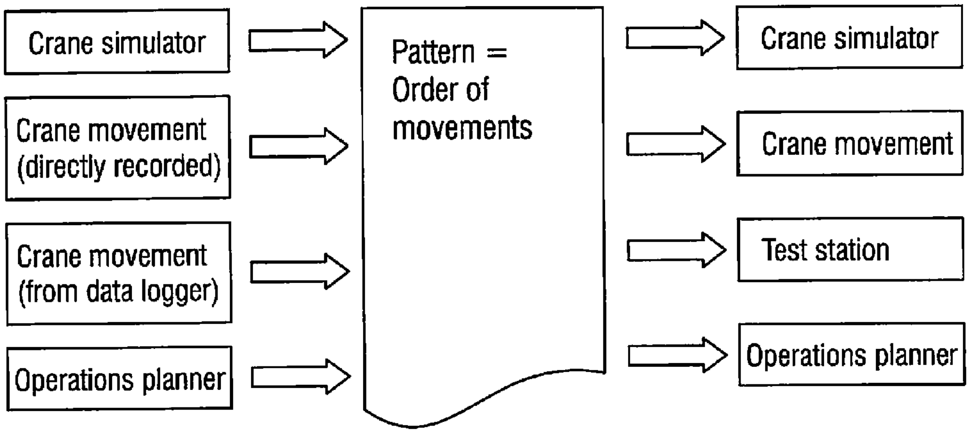
FIG. 2: a schematic representation of the pattern generation.

In addition, the movements of the crane can also be played back virtually on the crane simulator. The patterns can also be played back for the trials on a test station on which individual crane assemblies should be tested without the cooperation of a plurality of components. As shown in FIG. 2, a corresponding pattern, that is a series of movements, can be produced by means of the crane simulator, a directly recorded crane movement, a crane movement read out of the data logger and a movement simulated in the operations planner. This pattern can then be used in the crane simulator, for a crane movement, in the test station or in the operations planner.

This pattern can furthermore be filled from virtual movements of crane movements directly recorded in the crane simulator and actually traveled or also from the data logger already present on the crane, that is from a processor-controlled storage unit of the crane. In the end, a very good model of the crane movement, at least a model having sufficient accuracy, can be generated.

The graphical payload representation which can be produced and displayed using the monitor 10 can also be used on a PC in the planning of an operation. It is in this respect in particular of advantage that, for example, any planning data can be correspondingly taken over, can in particular be transferred from the PC to the monitor 10, and work can advantageously be carried out in the usual program environment. A mental adjustment is thus not required.

The operating mode, that is the "crane monitoring" mode or the "crane simulation" mode, can be freely selected and this can be done independently of the operating mode in which the system is just in.

It is furthermore possible that the crane driver or crane operator can always carry out the operation via the master switches familiar from the crane operation. The symbols used in the "crane monitoring" operating mode or program part are furthermore also found in the "crane simulation" mode. This makes it easier for the operator to orient himself quickly in both operating modes.

If the operator should require a further input means comparable with a PC mouse in addition to the input options via the input unit 12, this function is placed on the master switch in a similar manner to the TrackPoint on laptops and it is possible to switch over the function of the mast switch from normal operation to a TrackPoint function by pressing a button. The master switch in this operating mode acts as a further input means for the monitor 10.

The displays shown in FIGS. 3 to 15 relate to payloads and the associated curve representations. The curves shown in FIGS. 3 to 15 and the related explanations are made by way of example for the crane movement "boom luffing".

In addition to this degree of freedom or this executable movement possibility, a crane also allows further degrees of freedom depending on the crane configuration. Such further possible degrees of freedom can, for example, be the telescopic movement, the luffing of the accessory boom, a luffing of the derrick boom, a setting of the pulled derrick ballast, a changing of the derrick ballast radius, a rotation of the superstructure, a change in the angle of spread between the guying blocks in the Y guying, the crane inclination and the wind. With respect to the setting of the pulled derrick ballast, this can relate, for example, to the transmission of the force via pulling means from the derrick ballast to the superstructure. This force is as a rule smaller than the weight of the total derrick ballasts.

All curve representations share the general feature that all degrees of freedom except one are kept constant or held tight. This one variable degree of freedom is here usually shown on the x axis. The y axis represents the payload. Unlike the tabular representation, there are a number of main movements in the curve representation. The current main movement is the movement along the x axis shown in the graphic. In this manner, it is possible using different curves to represent payloads graphically via crane movements for which there are no tabular data material at all to date.

In addition to the curve representations relating to the movement "boom luffing" described below, there can accordingly also be further curve representations which will, however, only be looked at superficially in the following.

The data shown in the FIGS. 3 to 15 relate to a crane configuration having the degrees of freedom "boom luffing" and " telescoping". The curves presented in this respect relate to the boom luffing; accordingly, the remaining degrees of freedom, that is "telescoping" here, are kept constant. In this respect, the crane is observed in the two limiting extended states of a telescopic boom, wherein the first extension state corresponds to a non-bolted state with a 0% extended boom (telescope extension state 1, T 0+/0−/0+/0+) and the second extension state likewise corresponds to a non-bolted state with a 92% extended telescopic boom (telescope extension state 2, T 0+/92−/0+/0+). In the designation of the telescope extension states, for example telescope extension state 1, T 0+/0−/0+/0+, a "+" is set for the bolted state and a "−" for the non-bolted state.

Furthermore, extension states disposed therebetween can be provided which are likewise each not bolted, wherein the one extension state corresponds to a 30% extended boom (telescope extension state 3, T 0+/30−/10+/0+) and a further extension state corresponds to a 60% extended boom (telescope extension state 4, T 0+/60−/0+/0+).

Figure 3:
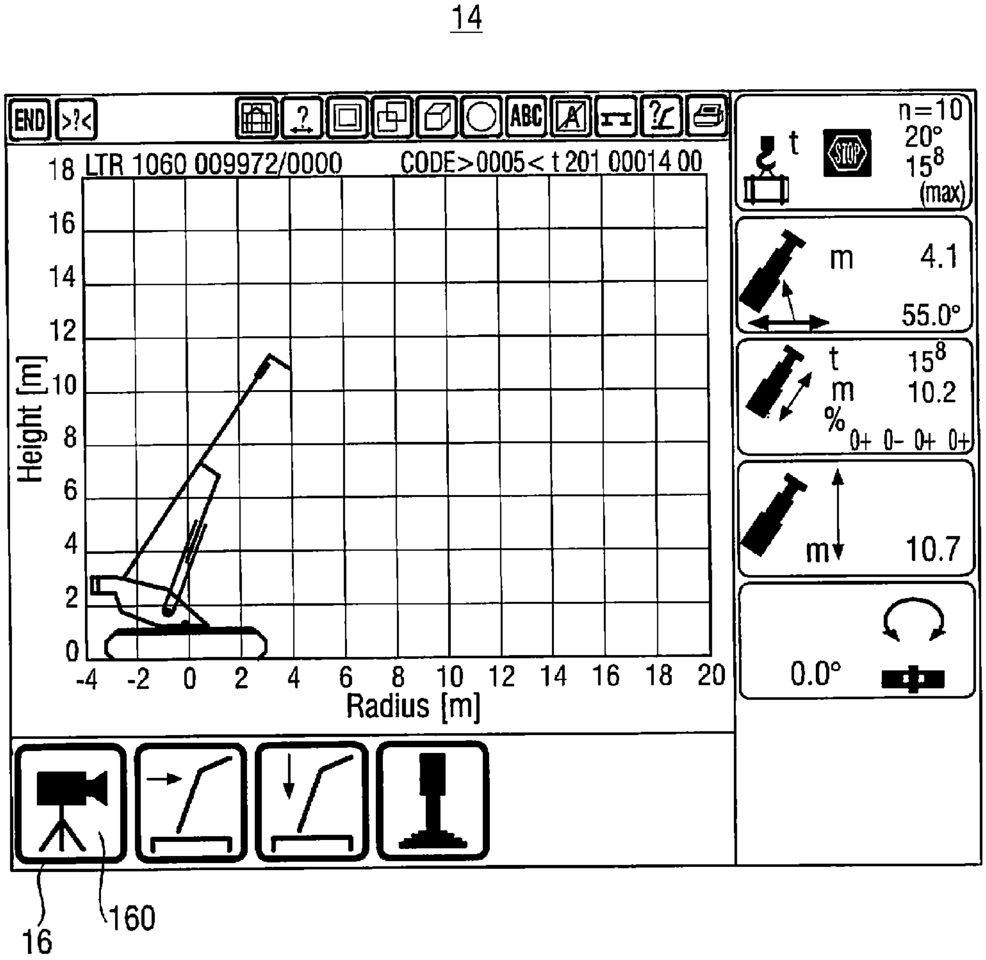
FIG. 3: a view of the display of the monitor.

FIG. 3 shows a possible representation which can be displayed by means of the display region 14 of the monitor 10. In this respect, the crane is shown schematically in the side view in the diagram, and indeed in telescopic state 1 with a non-bolted boom and 0% extension state of the boom. The main boom angle amounts to 55° and the radius to 4.1 m. As the operator can see from the display 14 in the top right hand part of the display region, the payload of the crane in this non-bolted state amounts to 15.8 t. The bold frame around the selection buttons 16 represents the selected state; here, with button 160, the selection "camera view".

FIG. 4 shows the associated payload table (or a section thereof) of the crane for the crane configuration shown in FIG. 3. The column is located herein which is marked by a thick line with the telescope length 10.2 and which has the payloads for the above telescope extension state. In this respect, the radius of 4.1 m in accordance with FIG. 3 is not shown directly. The correspondingly associated payload value is, however, determined by means of the calculation unit by interpolation of the adjacent radii 4.0 m and 4.5 m. The calculated value for the payload of the crane of 15.8 t then results from this.

Figure 5:
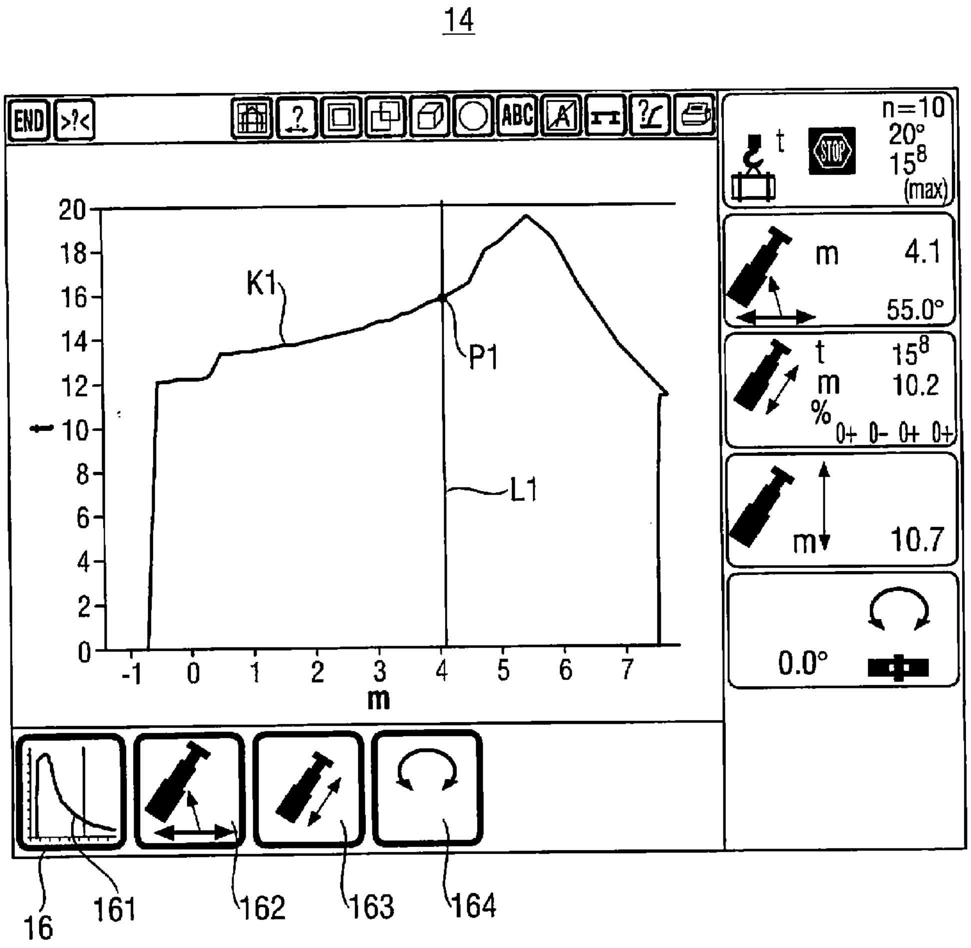
FIG. 5: a further view of the display of the monitor.

The table shown in FIG. 4 can be displayed graphically by a switching over by means of a diagram with associated payload curve K1 in dependence on the radius (cf. FIG. 5). In this curve K1, as stated above, the telescopic extension state 1 (T 0+/0−/10+/0+) of the telescopic boom is therefore held firmly and the boom can be lulled. In this respect, it is not the boom angle which is displayed in the x axis, but rather the associated radius in meters.

The vertical line L1 over the preferably red-colored dot P1 shows the current state with respect to the radius, that is the current state or the actual state. The actual state can be understood simply intuitively and safely at a glance due to the highlighting of the dot P1 with respect to the environment.

If, in accordance with FIG. 3, the movement in the crane simulator is traveled through, it is thus possible to watch for a stop of the (additionally present) load-torque limit in the test run. The crane operator only sees the result "STOP" on reaching the limit value. It is therefore a point-type display option.

In contrast, the solution shown in FIG. 5 allows the planned crane movement to be traveled through in the crane simulator and in so doing to obtain both a preview and a retrospective view. It is displayed how the payload would change if the crane were traveled in this direction. It is thus possible to carry out the planning faster and also to find the actually realizable crane movement faster.

The bold frame around the selection button 16 represents the selected state, here, with button 161, the selection "graphical display" with a graphical display of the payload curve K1 as well as, with button 162, the movement "boom luffing". Other selection possibilities would be, for example, with button 163, the movement "telescoping" and, with button 164, the movement "swiveling the superstructure".

Provision is advantageously made that the scales automatically adapt to the displayable region. The operator or the crane driver thereby receives the maximum possible degree of magnification. As results directly be comparison of FIG. 4 and FIG. 5, it is now particularly advantageously possible to recognize at a glance at which radius the maximum payload of the crane is reached and how the current situation of the crane is in the selected radius.

Figure 6:
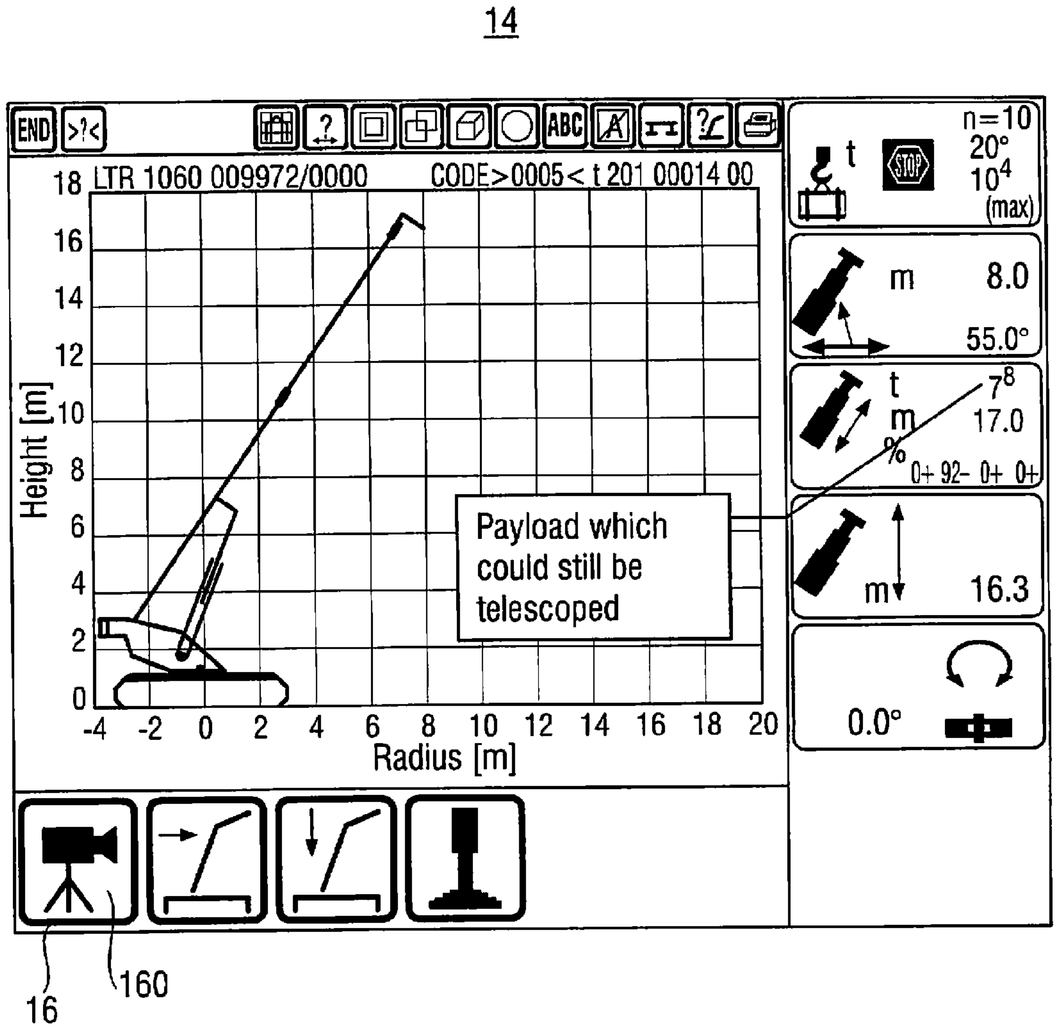
FIG. 6: a further view of the display of the monitor.

FIG. 6 shows a representation of the display region 14 with a schematic representation of the crane in the side view in the telescopic extension state 2 (T 0+/92−/0+/0+), at the main boom angle of 55° and in the radius of 8.0 m. As is shown in the top right region of the display 14, the maximum payload of the crane in this non-bolted state amounts to 10.4 t. As in state 1, the payload table (cf. FIG. 7) and the corresponding graphical payload curve K2 (cf. FIG. 8) are also added or able to be accessed from the crane simulation with respect to the "boom luffing" here. The vertical line L2 over the preferably red-colored dot here also shows in an analogous manner to FIG. 5 the current state with respect to the radius.

Figure 7:
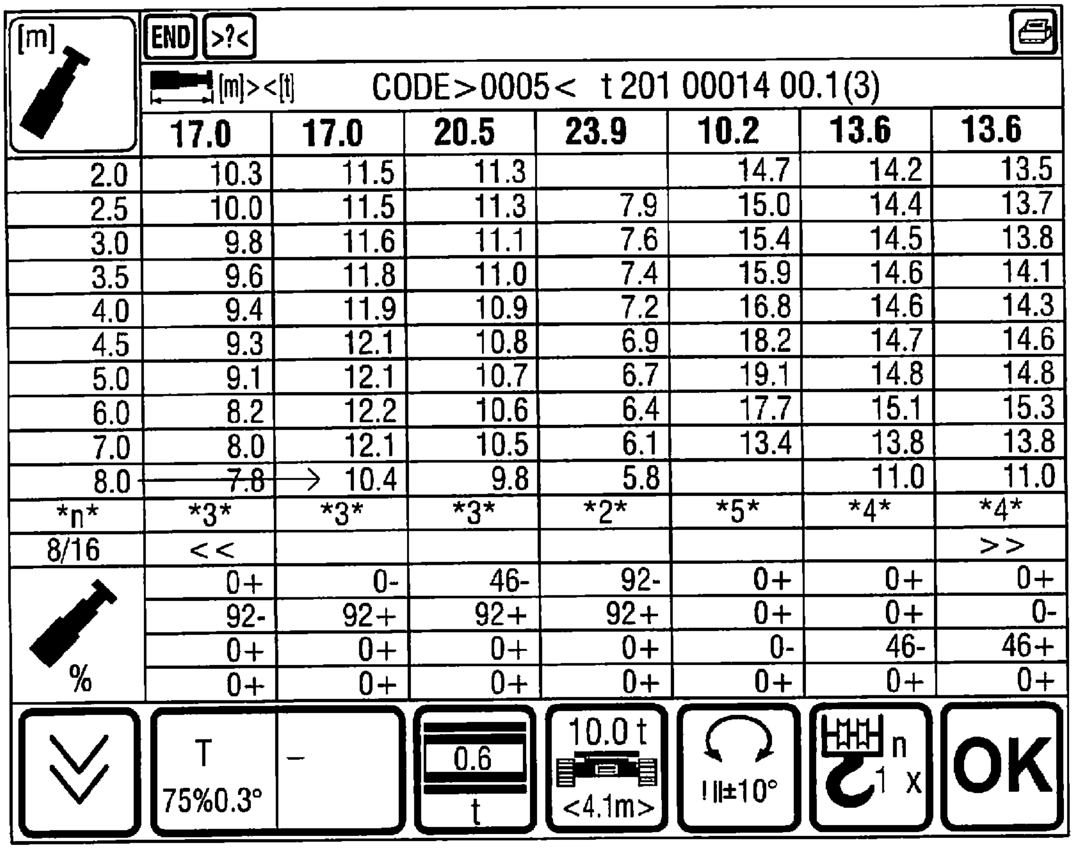
FIG. 7: a further view of the display of the monitor.
Figure 8:
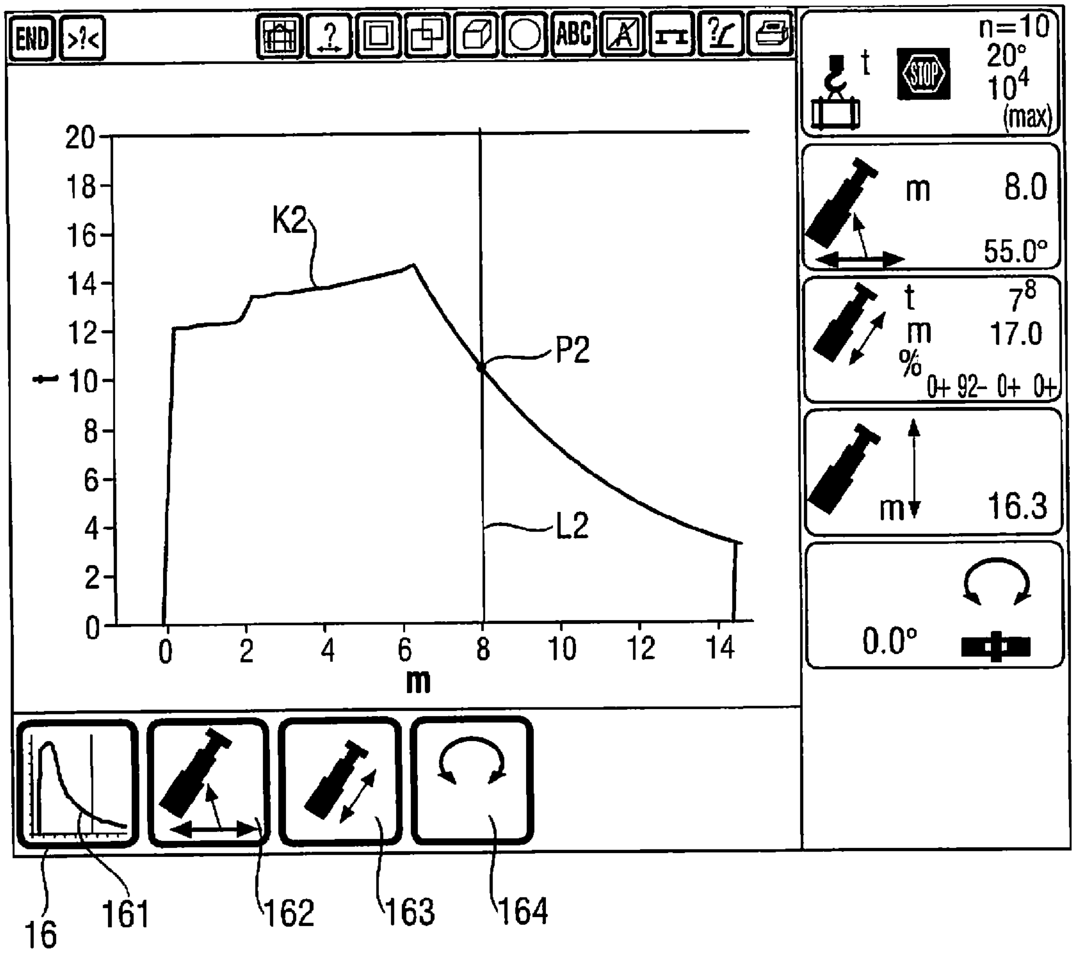
FIG. 8: a further view of the display of the monitor.
Figure 9:
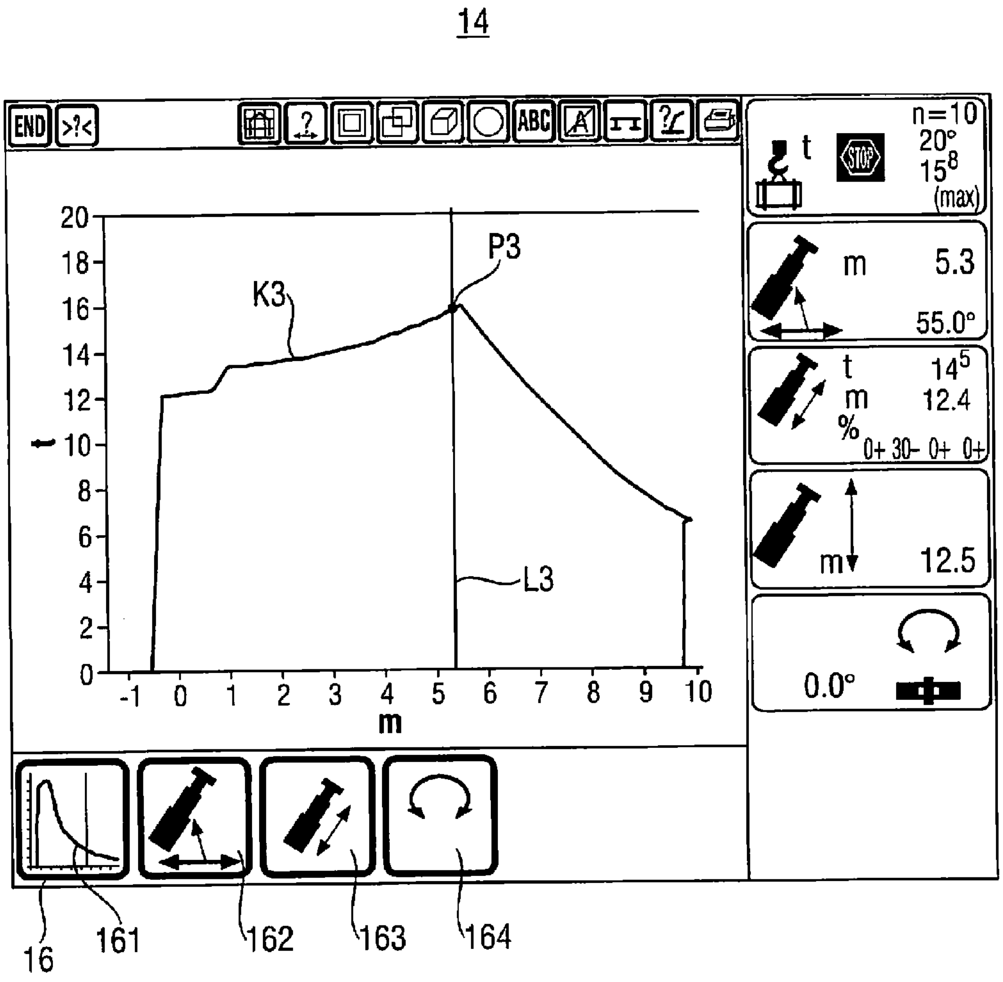
FIG. 9: a further view of the display of the monitor.
Figure 10:
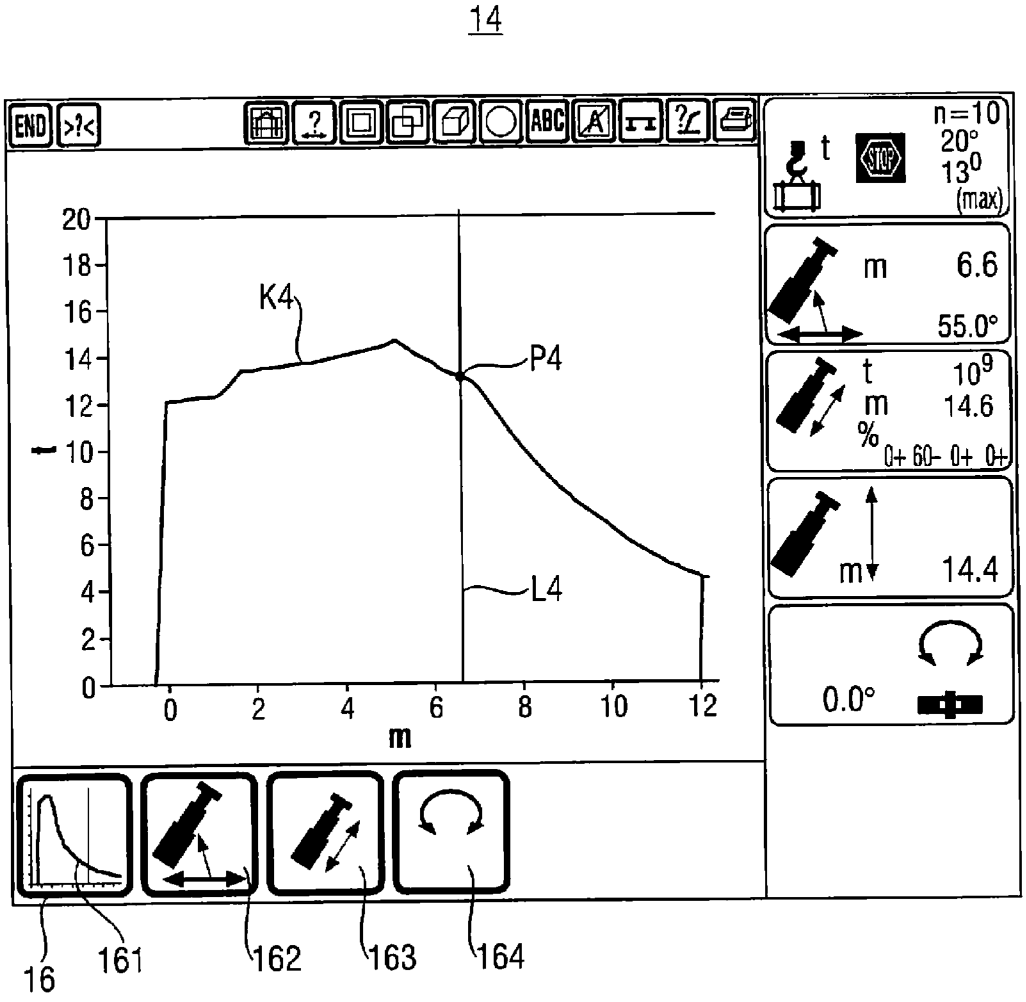
FIG. 10: a further view of the display of the monitor.

It is in this respect a question of the corresponding views in accordance with FIG. 4 and FIG. 5, but here in FIGS. 7 and 8, however, only for the telescopic extension state 2 (T 0+/92−0+/0+) shown in FIG. 6.

To switch from state 1 into state 2, the crane driver must extend the telescope 2 from 0% to 92%. In so doing, a load may also hang at the hook during the extension procedure. There are, however, no explicit columns for these different extension states from 0% to 92% in the payload table. The payload determination therefore has to be orientated on the bounding columns and the respective payload value. This advantageously takes place by means of the calculation unit of the monitor 10. The extension states of the telescope 2 lying between the extension states 30% (state 3) and 60% (state 4) can, for example, be displayed via the display region 14 of the monitor 10, with corresponding representations of the curves K3 and K4 being shown in FIG. 9 and FIG. 10.

The vertical line L3 or L4 on the preferably red-colored dot P3 or P4 here also shows in an analogous manner to FIGS. 5 and 8 the current state with respect to the radius.

Figure 15:
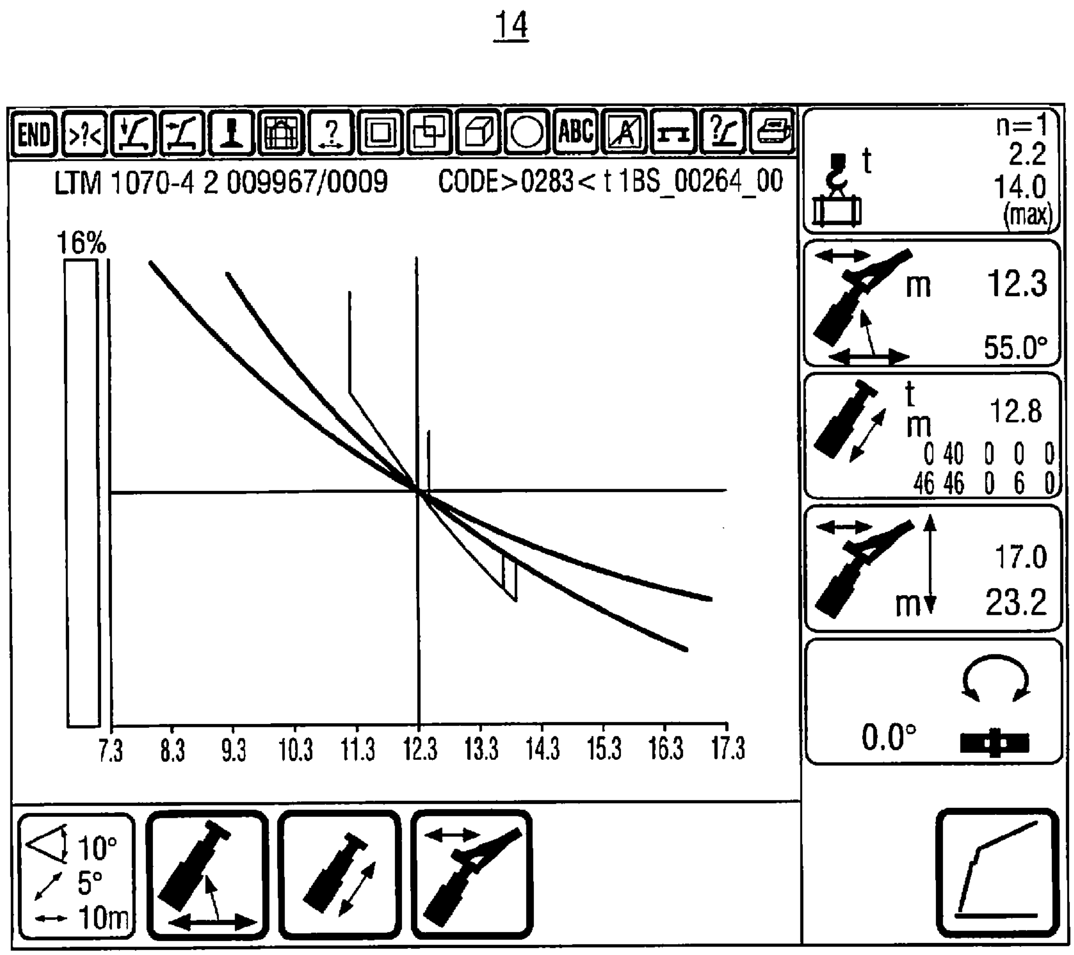
FIG. 15: a view of the display with a plurality of superimposed payload curves.

It is also conceivable to superimpose the curves shown in FIG. 5, FIG. 8, FIG. 9 and FIG. 10 (cf. FIG. 15). For there is generally the problem with the crane that as the number of degrees of freedom increases, the payload behavior of the crane is more and more difficult to predict. Accordingly, for this purpose, the payload behavior can be detected with more and more difficulty from a table system.

If, for example, the crane only had one degree of freedom, for instance "fixed boom length" and "boom can only be luffed", the payload behavior could still be predicted or read off from a table relatively simply.

With a crane having a plurality of degrees of freedom, for instance with a boom which can be telescoped under load or which can also simultaneously be luffed, etc., it is, however, helpful if the payloads can be imagined spatially. It is accordingly of advantage also to display the corresponding payload curves spatially.

Figure 11:
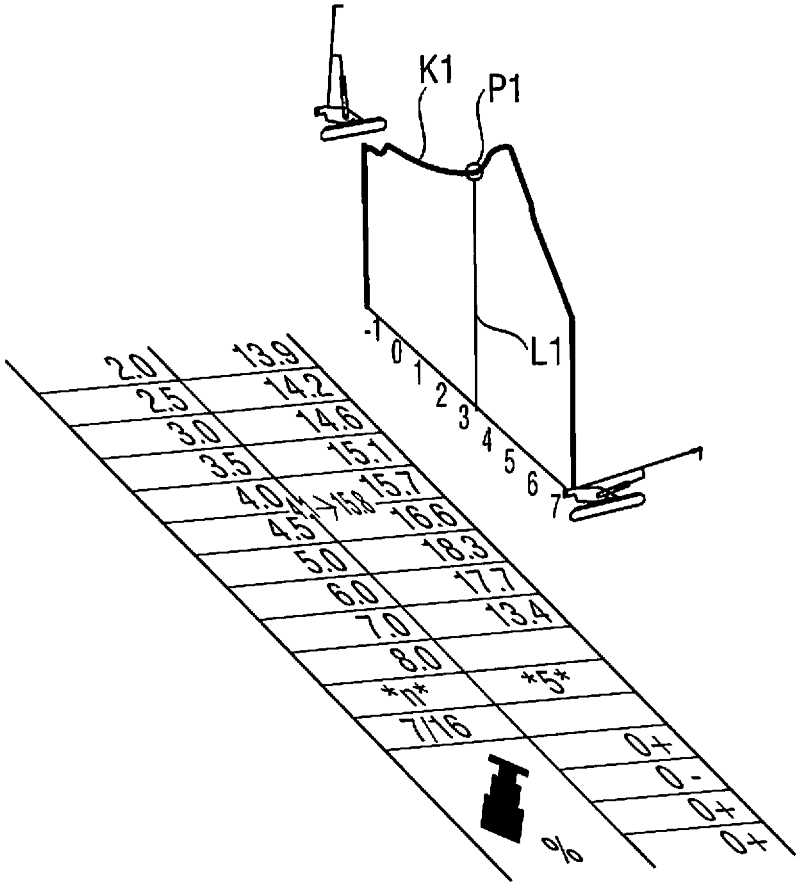
FIG. 11: a view of a perspective representation of a payload curve.
Figure 12:
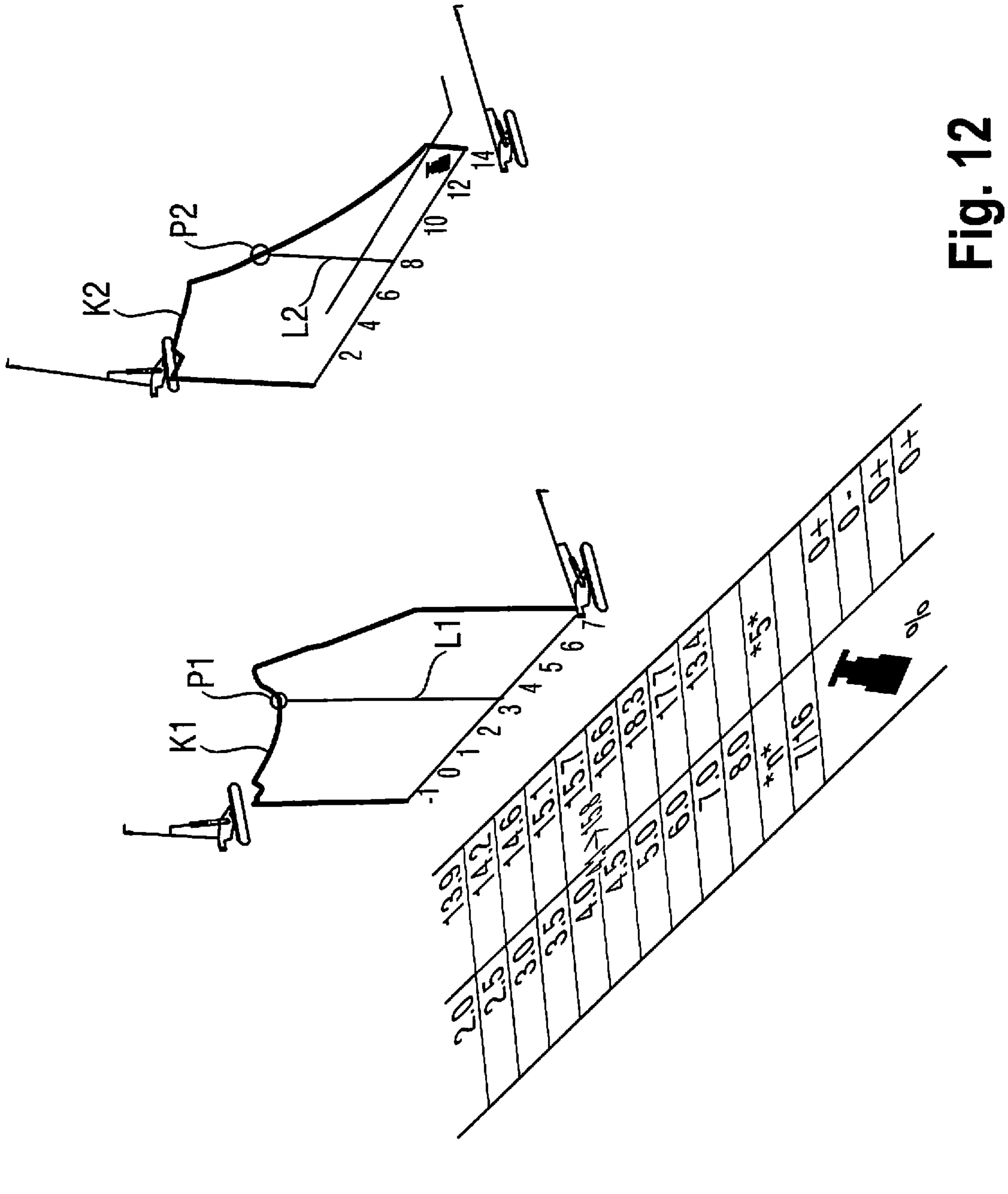
FIG. 12: a view of a perspective representation of payload curves.
Figure 13:
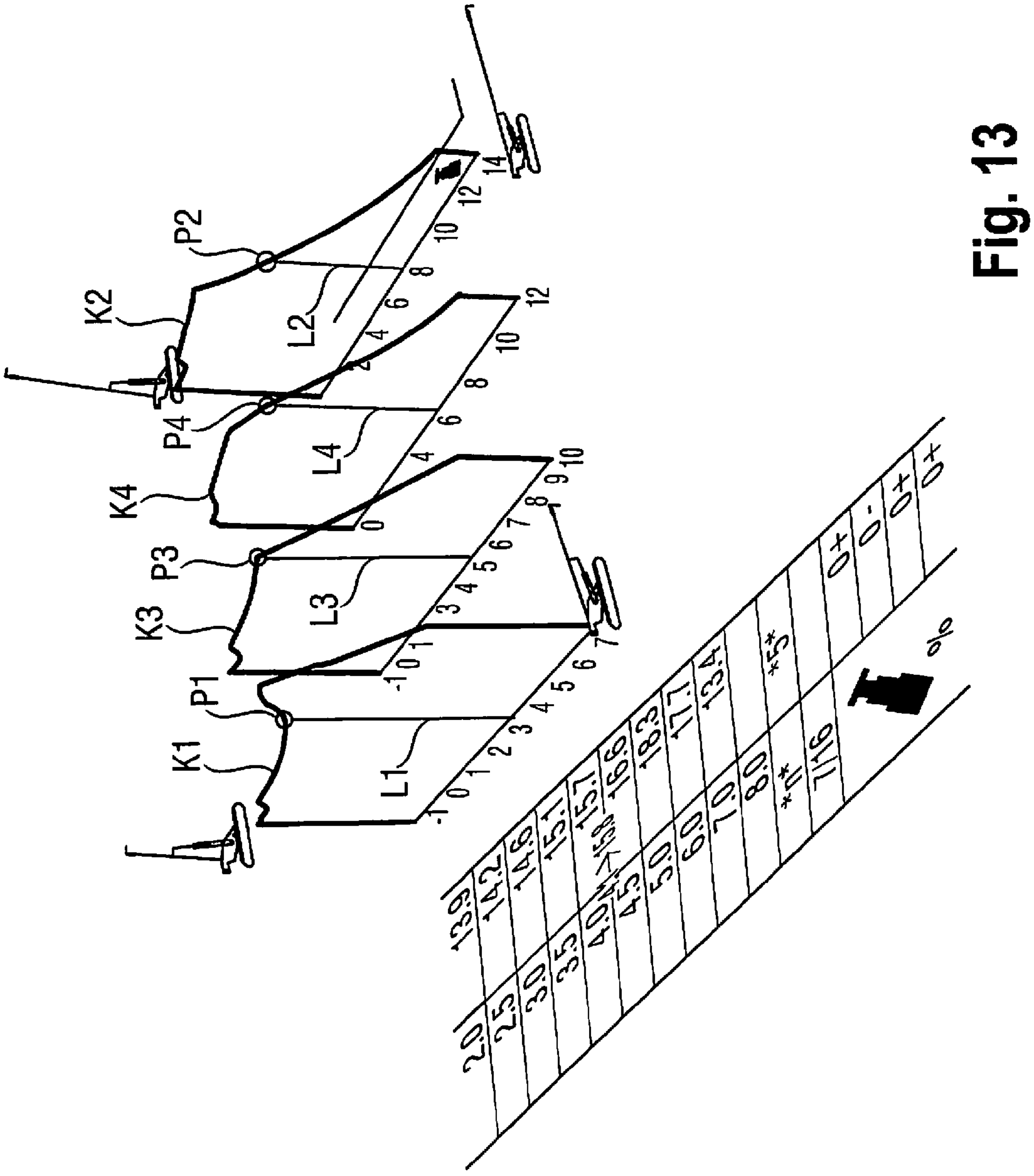
FIG. 13 a further view of a perspective representation of payload curves.
Figure 14:
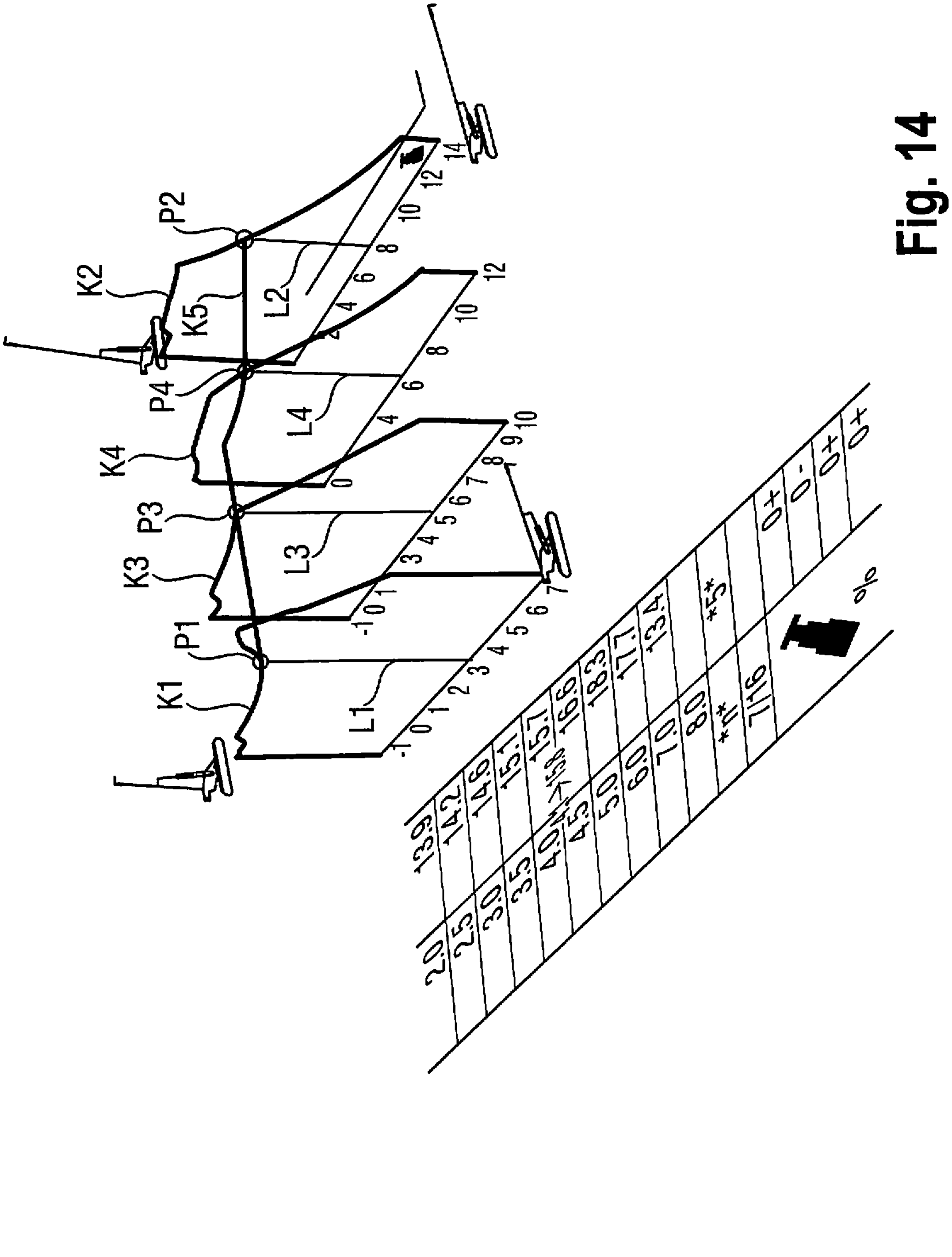
FIG. 14: a further view of a perspective representation of payload curves.

FIG. 11 shows the payload curve K1 of the state 1 (cf. FIG. 5) perspectively in space. The previous payload table can be seen underneath it. In FIG. 12, the payload curve K2 in accordance with state 2 (cf. FIG. 8) is added. In FIG. 13, the two payload curves K3 and K4 of state 3 (cf. FIGS. 9 and 10) are added. In an advantageous embodiment, these perspective views can also be displayed by means of the display 14.

It can clearly be recognized that the one direction in space represents a change in the boom angle, while the other direction in space represents a change by the telescoping. The payload is shown in the vertical.

There is likewise a curve, namely through the dots P1, P2, P3 and P4, for the telescoping with load at a fixed boom angle. If a starting situation is assumed as described under state 1 and if a target situation is assumed as under state 2, the curve can then also be displayed as follows by corresponding connections of the curves shown in the curves in accordance with FIGS. 11 to 14:

A payload curve K5 for the telescoping in a fixed luffing angle thus results. If all curve dots of the four curves K1, K2, K3 and K4 positioned next to one another in space were to be connected to one another, a map or a relief would result which describes the payload behavior.

In addition to a perspective representation, it is also conceivable to show a superimposition of the curves in a single diagram. A plurality of curves for different movements are thus shown in one plane in FIG. 15 and are scaled such that they intersect in the current actual state. The crane driver can thus recognize the movement with which he can most favorably reach the desired position.

Provision can furthermore be made that an automatic switchover of the curve takes place in dependence on the just traveled movement. On a luffing movement, the luffing curve can thus be displayed automatically and analogously thereto, on a telescopic movement, the associated telescoping curve.

The invention claimed is:

1. A crane, in particular a crawler crane or mobile crane having at least one monitoring and simulation means (10) by which a state of the crane can be both monitored and simulated, wherein the monitoring and simulation means (10) has least one input means (12) and at least one output means (14), said monitoring, means (10) monitoring at least one of actual state and actual state development of the crane and actual state and actual state development of a boom of the crane, wherein the actual state and the actual state development of the crane includes movement of the crane or the boom of the crane simulation means (10) representing and simulating at least one of a possible state and possible state development of the crane during crane operation, the simulating including a displayed virtual movement of at least a portion of the crane, and the actual and simulated states are both displayed by at least one monitor (10) forming part of the monitoring and simulation means (10) during the crane operation, wherein during crane operation the crane moves in response to a demand of a crane operator and the monitor displays the actual state of the crane, wherein the actual state of the crane switches to the simulated state of the crane after the crane moves and on demand by the crane operator, and when the switching to the simulated state occurs on demand by the crane operator the monitor displays a current state of the crane from the monitoring means, wherein the simulated state includes the displayed virtual movement of the at least the portion of the crane by the crane operator.

2. A crane in accordance with claim 1, wherein the monitoring and simulation means (10) has at least one calculation unit or is connectable or connected to at least one calculation unit, with the parameters describing the current state of the crane being evaluated by the calculation unit with at least one of a possible state, and a possible state development of the crane being at least one of simulated and calculated by the calculation unit.

3. A crane in accordance with claim 1, wherein the monitoring and simulation means (10) has at least one model generating means, with at least one of the state development and the possible state development calculated or modeled by cooperation of the calculation unit and the model generation means.

4. A crane in accordance with claim 3, wherein at least one of the state development and the possible state development is modeled as a model in the form of at least one mathematical function.

5. A crane in accordance with claim 3, wherein at least one of the state development and the possible state development is displayed as a function curve (K1, K2, K3, K4, K5) of the generated model, with at least one of the actual state of the crane and the possible actual state of the crane being displayed on the graph or on the curve.

6. A crane in accordance with claim 1, wherein the state development is a curve (K1, K2, K3, K4, K5) of the payload of the crane, with the payload curve (K1, K2, K3, K4, K5) being displayed as a curve (K1, K2, K3, K4, K5) graphically by the output means (14).

7. A crane in accordance with claim 6, wherein the payload curve (K1, K2, K3, K4, K5) is displayed in dependence on the radius of the crane, with the radius being entered on the x axis and the payload being entered on the y axis.

8. A crane in accordance with claim 6, wherein the actual state of the crane is displayed on the displayed payload curve (K1 K2 K3, K4, K5) as a bold dot (P1, P2, P3, P4) or cross.

9. A crane in accordance with claim 1, wherein the state development is a state development in dependence on at least one of the luffing movement and the telescopic movement of the crane.

10. A crane in accordance with claim 1, wherein a plurality of curves (K1, K2, K3, K4, K5) for different movements is calculated by the monitoring and simulation means (10) and displayed in a plane or perspectively.

11. A crane in accordance with claim 1, wherein the monitoring and simulation means (10) is connected to at least one master switch of the crane, with the master switch being operable in at least one first mode and in at least one second mode, at least one crane element being controlled in the first mode and inputs being carried out at the monitoring and simulation means (10) by the master switch in the second mode.

12. A crane in accordance with claim 11, wherein the at least one crane element is controlled by by the master switch in the second mode in the manner of a TrackPoint and/or of a PC mouse.

13. A crane in accordance with claim 1, wherein the monitoring and simulation means (10) includes at least one monitor having at least one keypad (20, 22, 24, 26, 28) as input means (12) and having at least one display (14) as output means (14); or the monitoring and simulation means (10) is designed as a monitor having at least one keypad (20, 22, 24, 26, 28) as input means (12) and at least one display (14) as output means (14).

14. A crane in accordance with claim 1, wherein at least one pattern relating to movements of the crane can be read out or played back virtually from storage means by the monitoring and simulation means (10), with one or more patterns being generated by the monitoring and simulation means (10), of at least one of a directly recorded crane movement, of a crane movement read out of the storage means and of a movement simulated in an operations planner.

15. A crane in accordance with claim 14, wherein the crane movement read out of the storage means is a data logger.

16. A monitoring or simulation means (10) for a crane, in particular for a crawler crane or mobile crane, having the monitoring and simulation means features in accordance with claim 1.

17. A crane in accordance with claim 1, wherein at least one of the state development and the possible state development is displayed as a function curve (K1, K2, K3, K4, K5) of the generated model, with at least one of the actual state of the crane and the possible actual state of the crane being displayed on the graph or on the curve.

18. A crane in accordance with claim 1, wherein the actual state of the crane is displayed on the displayed payload curve (K1, K2, K3, K4, K5) as a bold dot (P1, P2, P3, P4) or cross.

19. A crane in accordance with claim 1, wherein a plurality of curves for different movement of the crane are shown in one plane on the monitor (10) and scaled to intersect current actual state of the crane.

20. The crane of claim 1, wherein the actual state of the crane switches to the simulated state during run-time of the crane.

21. A crane, in particular a crawler crane or mobile crane, having at least one monitoring and simulation means (10) by which a state of the crane can be both monitored and simulated, wherein the monitoring and simulation means (10) has at least one input means (12) and at least one output means (14), said monitoring means (10) monitoring at least one of actual state and actual state development of the crane and actual state and actual state development of a boom of the crane, wherein the actual state and the actual state development of the crane includes movement of the crane or the boom of the crane, simulation means (10) representing and simulating at least one of a possible state and possible state development of the crane during crane operation, the simulating including a displayed virtual movement of at least a portion of the crane, the actual and simulated states are both displayed by at least one monitor (10) forming part of the monitoring and simulation means (10) during the crane operation, wherein during crane operation the crane moves in response to a demand of a crane operator and the monitor displays the actual state of the crane, wherein the actual state of the crane switches to the simulated state of the crane after the crane moves and on demand by the crane operator, and when the switching to the simulated state occurs on demand by the crane operator the monitor displays a current state of the crane from the monitoring means, wherein the simulated state includes the displayed virtual vement of the at least the portion of the crane by the crane operator.

22. A crane, in particular a crawler crane or mobile crane having at least one monitoring and simulation means (10) by which a state of the crane can be both monitored and simulated, wherein the monitoring and simulation means (10) has at least one input means (12) and at least one output, means (14), said monitoring means (10) monitoring at least one of actual state and actual state development of the crane and actual state and actual state development of a boom of the crane, wherein the actual state and the actual state development of the crane includes movement of the crane or the boom of the crane, simulation means (10) representing and simulating at least one of a possible state and possible state development of the crane during crane operation, the simulating including a displayed virtual movement of at least a portion of the crane, the actual and simulated states are both displayed by at least one monitor (10) forming part of the monitoring and simulation means (10) during the crane operation, wherein during crane operation the crane moves in response to a demand of a crane operator and the monitor displays the actual state of the crane, wherein the actual state of the crane switches to the simulated state of the crane after the crane moves and on demand by the crane operator, and when the switching to the simulated state occurs on demand by the crane operator the monitor displays a current state of the crane from the monitoring means, wherein the simulated state includes the displayed virtual movement of the at least the portion of the crane by the crane operator, a payload curve (K1) of a first state (1) showing planned crane movement to be traveled through the monitoring and simulation means (10), is perspectively displayed by the monitor (10), and a previous payload table is displayed underneath the payload curve (K1) on the monitor (10).

23. A crane in accordance with claim 22, wherein a payload curve (K2) in accordance with a second extension state (2) of the crane is perspectively displayed by the monitor (10) adjacent the perspective display of the first payload curve (K1).

24. A crane in accordance with claim 23, wherein two payload curves (K3, K4) of third and fourth states (3, 4) of the crane are added to and perspectively displayed by the monitor (10) adjacent the perspective displays of the first two payload curves (K1 K2).

* * * * *